US012722942B2

(12) United States Patent
Ma

(10) Patent No.: US 12,722,942 B2
(45) Date of Patent: Sep. 1, 2026

(54) BELT TERMINATION

(71) Applicant: OTIS ELEVATOR COMPANY, Farmington, CT (US)

(72) Inventor: Jun Ma, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 18/989,481

(22) Filed: Dec. 20, 2024

(65) Prior Publication Data

US 2026/0176106 A1 Jun. 25, 2026

(51) Int. Cl.
*B66B 7/08* (2006.01)

(52) U.S. Cl.
CPC .................................... *B66B 7/085* (2013.01)

(58) Field of Classification Search
CPC ... B66B 7/08; B66B 7/085; F16B 2/14; F16G 11/04; F16G 11/046
See application file for complete search history.

(56) References Cited

U.S. PATENT DOCUMENTS

| | | | |
|---|---|---|---|
| 6,662,408 B2 | 12/2003 | Perez et al. | |
| 8,505,173 B2 | 8/2013 | Pitts et al. | |
| 9,422,134 B2 | 8/2016 | Ikonen et al. | |
| 10,870,557 B2 | 12/2020 | Ma | |
| 11,198,588 B2 | 12/2021 | Morse et al. | |
| 2003/0041419 A1* | 3/2003 | Perez | B66B 7/085 24/136 R |

FOREIGN PATENT DOCUMENTS

| | | | |
|---|---|---|---|
| CN | 103195867 B | 3/2016 | |
| CN | 106629310 B | 5/2019 | |
| CN | 108792885 B | 10/2019 | |
| CN | 210457084 U | 5/2020 | |
| CN | 211393455 U | 9/2020 | |
| CN | 211393461 U | 9/2020 | |
| CN | 212360650 U | 1/2021 | |
| CN | 214192145 U | 9/2021 | |
| CN | 214780097 U | 11/2021 | |
| CN | 217867584 U | 11/2022 | |
| CN | 218058046 U | 12/2022 | |
| CN | 116057302 A | 5/2023 | |
| EP | 3551566 B1 | 7/2020 | |
| EP | 3609828 B1 | 11/2021 | |
| JP | 6522268 B1 * | 5/2019 | B66B 7/085 |

* cited by examiner

*Primary Examiner* — Minh Truong
(74) *Attorney, Agent, or Firm* — Carlson, Gaskey & Olds, P.C.

(57) ABSTRACT

A termination includes a housing that defines an internal socket configured to receive an end of an elevator suspension member. The housing is formed as a unitary body that includes a first face plate, a second face plate, a first side plate extending between the first face plate and the second face plate, and a second side plate extending between the first face plate and the second face plate.

16 Claims, 4 Drawing Sheets

BELT TERMINATION

BACKGROUND

The subject matter disclosed herein relates to elevator systems. More particularly, the present disclosure relates to termination of suspension members of elevator systems.

A typical elevator system includes an elevator car, suspended by one or more suspension members, typically a rope or belt that moves along a hoistway. The suspension member includes one or more tension members and is routed over a plurality of sheaves, with one sheave, e.g., a drive sheave, operably connected to a machine. The machine drives movement of the elevator car via interaction of the drive sheave with the suspension member. The elevator system may also include a counterweight that interacts with the suspension member. One or more of the ends of the suspension member are terminated, or retained in the hoistway, via a belt termination assembly.

Elevator belt termination assemblies are comprised of multiple pieces that are assembled together. An end of a belt is wrapped around a wedge, which is received within the belt termination assembly, and is held in place by a clamping force. Manufacturing of multi-piece belt termination can be disadvantageous from a tolerance and assembly perspective.

SUMMARY

An illustrative example termination includes: a housing defining an internal socket that receives an end of an elevator suspension member; wherein the housing comprises a unitary body including: a first face plate; a second face plate; a first side plate extending between the first face plate and the second face plate; and a second side plate extending between the first face plate and the second face plate.

In addition to one or more of the features described herein, or as an alternative, the unitary body includes a first bend formed between the first side plate and the first face plate, a second bend formed between the first side plate and the second face plate, a third bend formed between the second face plate and the second side plate.

In addition to one or more of the features described herein, or as an alternative, inner surfaces of the first face plate, the second face plate, the first side plate, and the second side plate define the internal socket, and including a weld interface formed between the second side plate and the first face plate.

In addition to one or more of the features described herein, or as an alternative, the first face plate includes an extension portion that extends outwardly beyond an outer surface of the second side plate.

In addition to one or more of the features described herein, or as an alternative, the second side plate extends from the third bend to a distal edge surface that faces the extension portion.

In addition to one or more of the features described herein, or as an alternative, the distal edge surface is flush with an inner surface of the extension portion, and wherein a weld interface is formed adjacent to the distal edge surface.

In addition to one or more of the features described herein, or as an alternative, the extension portion includes a plurality of slots and wherein the distal edge surface includes a plurality of tabs that are received within the plurality of slots.

In addition to one or more of the features described herein, or as an alternative, the second side plate extends from the third bend to a side plate distal edge surface that extends outwardly beyond an outer surface of the first face plate.

In addition to one or more of the features described herein, or as an alternative, the first face plate extends from the first bend to a face plate distal edge surface that faces an inner surface of the second side plate, and wherein the weld interface is formed adjacent the face plate distal edge surface.

In addition to one or more of the features described herein, or as an alternative, a face plate distal edge surface of the first face plate includes a plurality of tabs that are received within a plurality of slots formed in an extension portion of the second side plate.

An illustrative example method includes: bending a single piece of material to form a termination housing defining an internal socket that receives an end of an elevator suspension member, wherein the termination housing includes a first face plate, a second face plate, a first side plate extending between the first face plate and the second face plate, and a second side plate extending between the first face plate and the second face plate.

In addition to one or more of the features described herein, or as an alternative, the method includes forming a first bend between the first side plate and the first face plate; forming a second bend between the first side plate and the second face plate; and forming a third bend between the second face plate and the second side plate.

In addition to one or more of the features described herein, or as an alternative, inner surfaces of the first face plate, the second face plate, the first side plate, and the second side plate define the internal socket, and the method includes welding the second side plate to the first face plate to form a weld interface therebetween.

In addition to one or more of the features described herein, or as an alternative, the method includes forming an extension portion along an edge of the first face plate that extends outwardly beyond an outer surface of the second side plate.

In addition to one or more of the features described herein, or as an alternative, the second side plate extends from the third bend to a distal edge surface, and the method includes positioning the distal edge surface to face the extension portion.

In addition to one or more of the features described herein, or as an alternative, the method includes positioning the distal edge surface to be flush with an inner surface of the extension portion, and forming a weld interface along the distal edge surface.

In addition to one or more of the features described herein, or as an alternative, the method includes: forming a plurality of slots in the extension portion; forming a plurality of tabs in the distal edge surface; and inserting the plurality of slots into the plurality of slots.

In addition to one or more of the features described herein, or as an alternative, the method includes forming the second side plate to extend from the third bend to a side plate distal edge surface that extends outwardly beyond an outer surface of the first side plate.

In addition to one or more of the features described herein, or as an alternative, the method includes forming the first face plate to extend from the first bend to a face plate distal edge surface that faces an inner surface of the second side plate, and forming a weld interface along the face plate distal edge surface.

In addition to one or more of the features described herein, or as an alternative, the method includes: forming a plurality of slots in the extension portion; forming a plurality of tabs in the side plate distal edge surface; and inserting the plurality of tabs into the plurality of slots.

The various features and advantages of an example embodiment will become apparent to those skilled in the art from the following detailed description. The drawings that accompany the detailed description can be briefly described as follows.

DETAILED DESCRIPTION

Embodiments of this disclosure provide a single-piece belt termination comprising a housing defining an internal socket that receives an end of an elevator suspension member.

Figure 1:
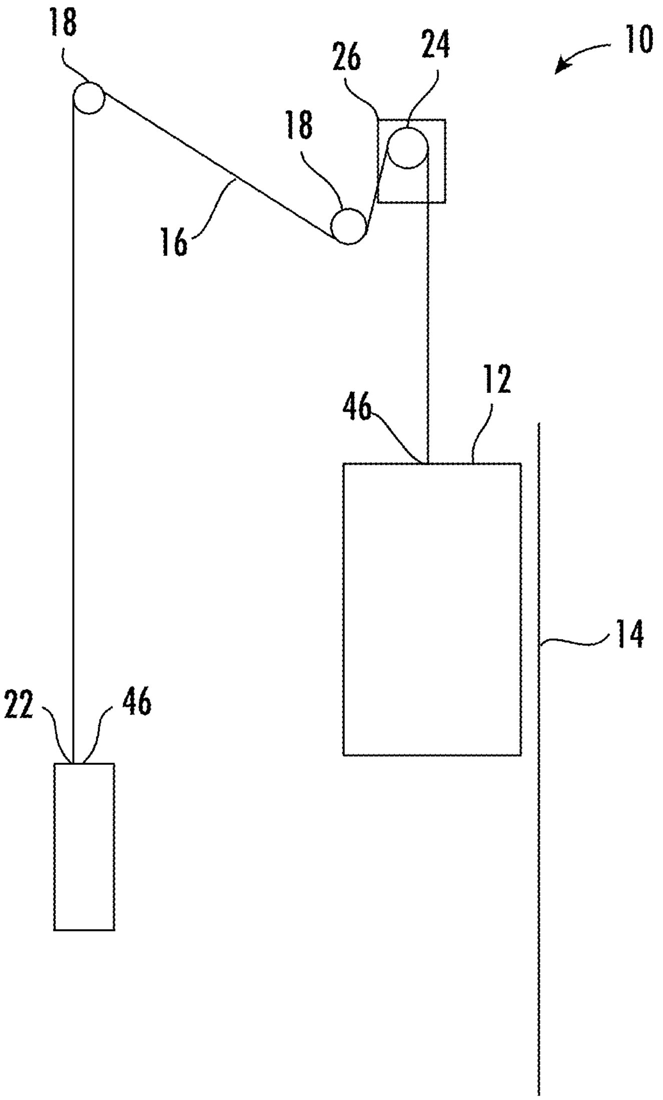
FIG. 1 schematically illustrates selected portions of an elevator system.

FIG. 1 is a schematic view of an exemplary traction elevator system 10. In an example, the elevator system 10 includes an elevator car 12 operatively suspended or supported in a hoistway 14 with one or more belts 16. The one or more belts 16 interact with one or more sheaves 18 to be routed around various components of the elevator system 10. The one or more belts 16 may also be connected to a counterweight 22, which is used to help balance the elevator system 10 and reduce the difference in belt tension on both sides of a traction sheave during operation.

At least one of the sheaves may be a traction sheave 24 that is driven by a machine 26 to move the belts 16 around the traction sheave 24. Some of the other sheaves 18 may include diverter, deflector or idler sheaves that help guide the belts 16 around various components of the elevator system 10. The example of FIG. 1 shows a 1:1 roping arrangement in which the one or more belts 16 terminate at the car 12 and counterweight 22; however, other roping arrangements may also be used.

The belts 16 are constructed to have sufficient flexibility when passing over the one or more sheaves 18 to provide low bending stresses, meet belt life requirements and have smooth operation, while being sufficiently strong to be capable of meeting strength requirements for suspending and/or driving the elevator car 12.

Figure 2:
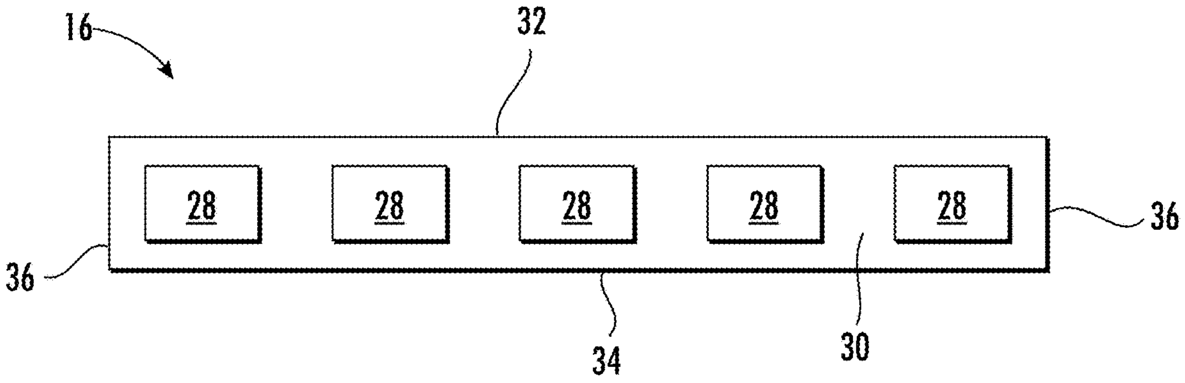
FIG. 2 is a cross-sectional view of an embodiment of a belt for an elevator system.

FIG. 2 shows a cross-sectional schematic of an example of a belt 16. In this example, the belt 16 includes a plurality of tension elements 28 extending longitudinally along the belt 16. The tension elements 28 in this example are rectangular in cross-section; however, other cross-sectional shapes, such as circular for example, may also be utilized. The tension elements 28 may be at least partially encased in a jacket 30, which is formed from a polymer material such as a thermoplastic polyurethane (TPU), for example. The belt 16 defines a traction side 32, which is interactive with the traction sheave 24 and a back side 34 opposite the traction side 32. The belt 16 further defines belt edges 36 extending between the traction side 32 and the back side 34.

Figure 3:
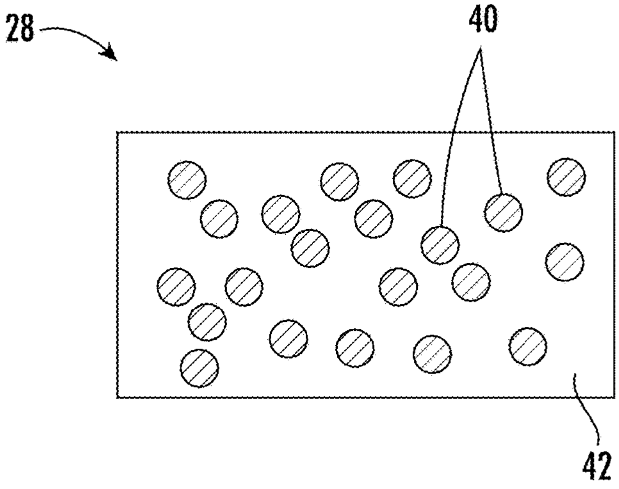
FIG. 3 illustrates an embodiment of a tension element for a belt of an elevator system.

In an example shown FIG. 3, the tension elements 28 may include a plurality of fibers 40 bonded to a polymer matrix 42 to form the tension elements 28. The fibers 40 may be formed of one or more of a number of materials, such as metal, carbon, glass, polyester, nylon, aramid or other polyimide materials. The matrix 42 may be formed of, for example a thermoset or thermoplastic material.

FIGS. 4A-4E show an example of a termination 46 (FIG. 1) at the elevator car 12 or the counterweight 22, for example, wherein a belt end 48 (FIG. 7) of the belt 16 is installed and retained in the termination 46.

In some implementations, the termination 46 is formed as a single-piece housing 50 having one or more housing inner surfaces 52 tapering inwardly toward the belt 16 with increasing distance from the belt end 48. In an example, a wedge 54 (FIG. 7) is installed in the housing 50 and the end 48 of the belt 16 is wrapped around the wedge 54 and received between the housing inner surfaces 52 and the wedge 54.

In an example, the housing 50 defines an internal socket 56 that receives the end of the belt 16.

In an implementation, the housing 50 comprises a unitary body (FIG. 4D) that includes a first face plate 58, a second face plate 60, a first side plate 62 extending between the first face plate 58 and the second face plate 60, and a second side plate 64 extending between the first face plate 58 and the second face plate 60.

In an example, the unitary body comprises sheet metal.

Figure 4A:
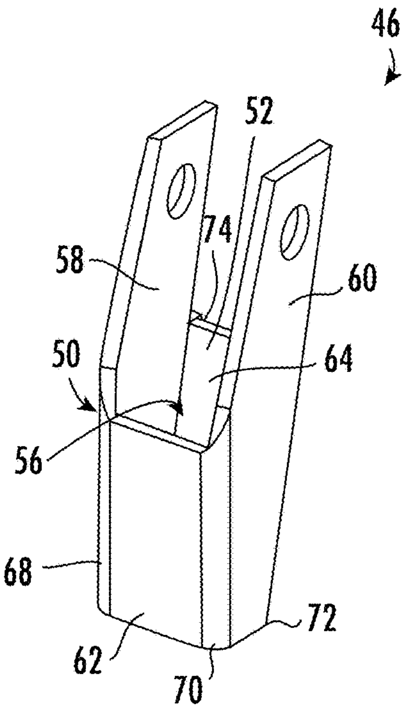
FIG. 4A illustrates a perspective view of a first face plate side of an example of a termination for a belt of an elevator system.
Figure 4B:
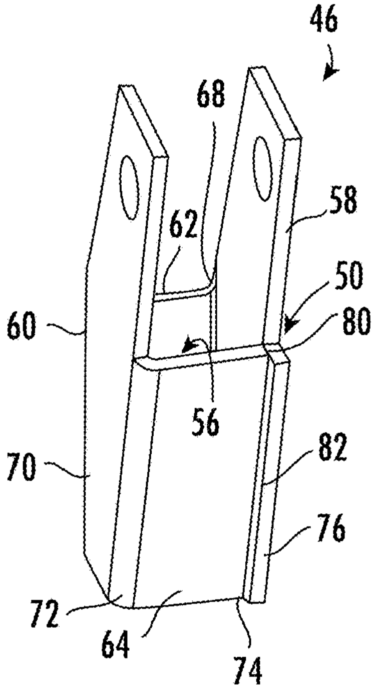
FIG. 4B illustrates a perspective view of a second face plate side of the termination of FIG. 4A.
Figure 4C:
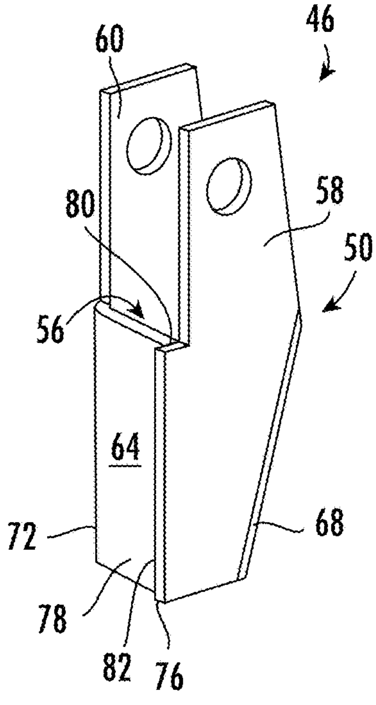
FIG. 4C illustrates a perspective view of a side plate side of the termination of FIG. 4A.
Figure 4D:
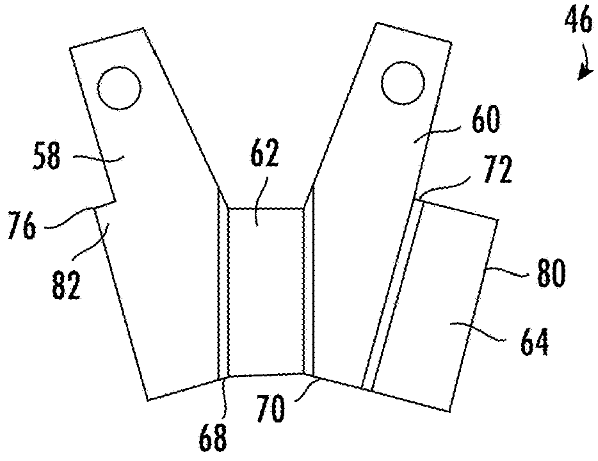
FIG. 4D illustrates a perspective view of the termination of FIG. 4A in an unfolded state.
Figure 4E:
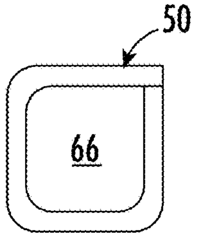
FIG. 4E is a schematic representation of the termination of FIG. 4A wrapped around a tooling member.

In an implementation, the housing 50 may comprise a single-piece of sheet metal material, as shown in FIG. 4D, which is folded or bent around a tooling member 66 (FIG. 4E), e.g. a mandrel, to form the internal socket 56.

In an example, the unitary body includes a first bend 68 formed between the first side plate 62 and the first face plate 58, a second bend 70 formed between the first side plate 62 and the second face plate 60, a third bend 72 formed between the second face plate 60 and the second side plate 64, and a weld interface 74 formed between the second side plate 64 and the first face plate 58.

In an example, the weld interface 74 comprises a single weld interface, and is the only weld in the housing 50.

In an example, inner surfaces of the first face plate 58, the second face plate 60, the first side plate 62, and the second side plate 64 define the internal socket 56.

In an example, the first face plate 58 includes an extension portion 76 that extends outwardly beyond an outer surface 78 of the second side plate 64. The second side plate 64 extends from the third bend 72 to a distal edge surface 80 that faces the extension portion 76.

In an example, the distal edge surface 80 is flush with an inner surface 82 of the extension portion 76 as shown in FIGS. 4B-C.

In an example, the distal edge surface 80 abuts against the inner surface of the extension portion 76.

In an example, the weld interface 74 is formed adjacent to the distal edge surface 80. Any type of welding operation can be used to form the weld interface 74.

Figure 5:
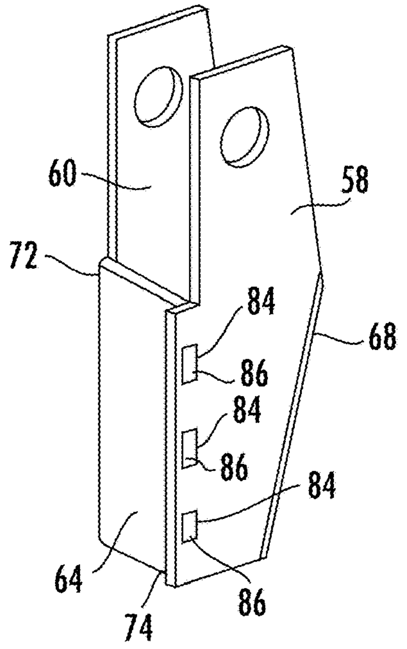
FIG. 5 illustrates a perspective view of another example of a termination for a belt of an elevator system.

FIG. 5 shows another example of a termination 46' that is similar to that of FIG. 4A, but which includes a plurality of slots 84 formed in the extension portion 76. In an example, the distal edge surface 80 includes a plurality of tabs 86 that are received within the plurality of slots 84.

In an example, as the third bend 72 is formed, the tabs 86 are inserted into the slots 84. No additional welding operation may be needed.

Figure 6:
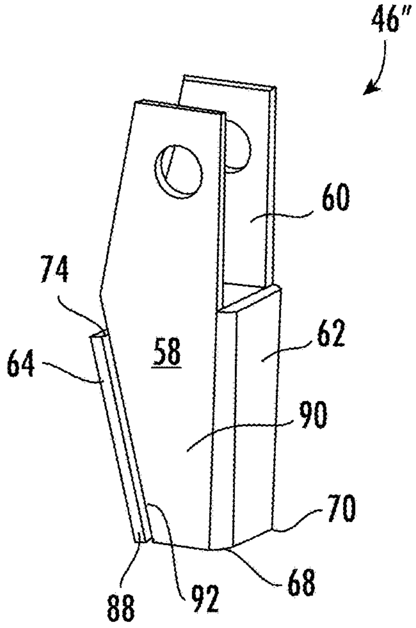
FIG. 6 illustrates a perspective view of another example of a termination for a belt of an elevator system.

FIG. 6 shows another example of a termination 46" that is similar to that of FIG. 4A. In this example, the second side plate 64 extends from the third bend 72 to a side plate distal edge surface 88 that extends outwardly beyond an outer surface 90 of the first face plate 58.

In an example, the first face plate 58 extends from the first bend 68 to a face plate distal edge surface 92 that faces the inner surface of the second side plate 64. In an example, the weld interface 74 is formed adjacent the face plate distal edge 92 surface.

In an example, the face plate distal edge surface 92 abuts against the inner surface of the second side plate 64.

In some implementations, the side weld locations of the single weld minimize clearance requirements to nearby structures.

In an example, the distal edge surface 92 includes a plurality of tabs 86 that are received within the plurality of slots formed in the extension portion of the side plate 64.

In an example, as the third bend 72 is formed, the tabs 86 are inserted into the slots 84. No additional welding operation may be needed.

Figure 7:
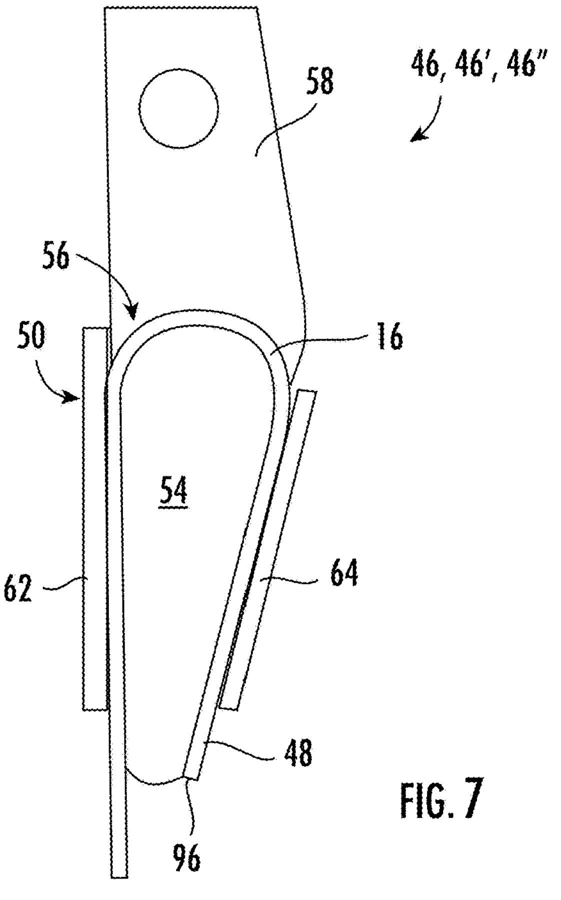
FIG. 7 illustrates a side view of another example of an end of a belt as received within any of the terminations shown and described herein.

FIG. 7 shows an example, of the end 48 of the belt 16 being wrapped around the wedge 54 that is received within the socket 56. The wedge 54 can be received within any socket 56 of any of the disclosed terminations 46, 46', 46". In an example, the second side plate 64 is tapered inwardly toward a distal end 96 of the end 48 of the belt 16 to tightly clamp the belt end 48 between outer surfaces of the wedge 54 and inner surfaces of the housing 50.

In an implementation, a method of manufacturing a termination 46, 46', 46" is also disclosed. In an example, the method includes bending a single piece of material to form a termination housing defining an internal socket that receives an end of an elevator suspension member, wherein the termination housing includes a first face plate, a second face plate, a first side plate extending between the first face plate and the second face plate, and a second side plate extending between the first face plate and the second face plate.

The method may include any of the following steps and/or features either alone or in any combination thereof.

In an example, the method may include: forming a first bend between the first side plate and the first face plate; forming a second bend between the first side plate and the second face plate; and forming a third bend between the second face plate and the second side plate.

In an example, inner surfaces of the first face plate, the second face plate, the first side plate, and the second side plate define the internal socket. Those inner surfaces may include friction enhancing features such as roughness, grooves, knurls etc.

In an example, the method may include welding the second side plate to the first face plate to form a weld interface therebetween.

In an example, the method may include forming an extension portion along an edge of the first face plate that extends outwardly beyond an outer surface of the second side plate.

In an example, the second side plate extends from the third bend to a distal edge surface, and the method may include positioning the distal edge surface to face the extension portion.

In an example, the method may include positioning the distal edge surface to be flush with an inner surface of the extension portion, and forming the weld interface along the distal edge surface.

In an example, the method may include: forming a plurality of slots in the extension portion; forming a plurality of tabs in the distal edge surface; and inserting the plurality of tabs into the plurality of slots.

In an example, the method may include forming the second side plate to extend from the third bend to a side plate distal edge surface that extends outwardly beyond an outer surface of the first side plate.

In an example, the method may include forming the first face plate to extend from the first bend to a face plate distal edge surface that faces the inner surface of the second side plate, and forming the weld interface along the face plate distal edge surface.

In an example, the method may include forming the termination housing as unitary sheet metal body.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A termination comprising:

a housing defining an internal socket that receives an end of an elevator suspension member;

wherein the housing comprises a unitary body including:

a first face plate;

a second face plate;

a first side plate extending between the first face plate and the second face plate;

a second side plate extending between the first face plate and the second face plate;

the unitary body includes a first bend formed between the first side plate and the first face plate, a second bend formed between the first side plate and the second face plate, a third bend formed between the second face plate and the second side plate; and wherein:

the first face plate includes an extension portion that extends outwardly beyond an outer surface of the second side plate and the second side plate extends from the third bend to a distal edge surface that faces an inner surface of the extension portion, the first face plate and the extension portion being co-planar; or the second side plate extends from the third bend to an extension portion having a side plate distal edge that extends outwardly beyond an outer surface of the first face plate and the first face plate extends from the first bend to a distal edge surface that faces an inner surface of the extension portion, the second side plate and the extension portion being co-planar.

2. The termination of claim 1, wherein inner surfaces of the first face plate, the second face plate, the first side plate, and the second side plate define the internal socket, and including a weld interface formed between the second side plate and the first face plate.

3. The termination of claim 1, wherein the distal edge surface is flush with the inner surface of the extension portion, and wherein a weld interface is formed adjacent to the distal edge surface.

4. The termination of claim 1, wherein the extension portion is formed with the first face plate and includes a plurality of slots and wherein the distal edge surface includes a plurality of tabs that are received within the plurality of slots.

5. The termination of claim 1, wherein at least one of the first face plate and the second side plate includes a plurality of tabs and the other of the first face plate and the second side plate includes a plurality of slots that receive the plurality of tabs.

6. The termination of claim 1, wherein the distal edge surface is abutted against the inner surface of the extension portion.

7. A termination comprising:

a housing defining an internal socket that receives an end of an elevator suspension member;

wherein the housing comprises a unitary body including:

a first face plate;

a second face plate;

a first side plate extending between the first face plate and the second face plate;

a second side plate extending between the first face plate and the second face plate; and the unitary body includes a first bend formed between the first side plate and the first face plate, a second bend formed between the first side plate and the second face plate, a third bend formed between the second face plate and the second side plate; and wherein:

inner surfaces of the first face plate, the second face plate, the first side plate, and the second side plate define the internal socket, and including a weld interface formed between the second side plate and the first face plate; and the second side plate extends from the third bend to a side plate distal edge surface that extends outwardly beyond an outer surface of the first face plate.

8. The termination of claim 7, wherein the first face plate extends from the first bend to a face plate distal edge surface that faces an inner surface of the second side plate, and wherein the weld interface is formed adjacent the face plate distal edge surface.

9. A method of manufacturing comprising:

bending a single piece of material to form a termination housing defining an internal socket that receives an end of an elevator suspension member, wherein the termination housing includes a first face plate, a second face plate, a first side plate extending between the first face plate and the second face plate, and a second side plate extending between the first face plate and the second face plate;

forming a first bend between the first side plate and the first face plate;

forming a second bend between the first side plate and the second face plate;

forming a third bend between the second face plate and the second side plate; and including:

forming the first face plate with an extension portion that extends outwardly beyond an outer surface of the second side plate and wherein the second side plate extends from the third bend to a distal edge surface that faces an inner surface of the extension portion, the first face plate and the extension portion being co-planar; or forming the second side plate to extends from the third bend to an extension portion having a side plate distal edge that extends outwardly beyond an outer surface of the first face plate and the first face plate extends from the first bend to a distal edge surface that faces an inner surface of the extension portion, the second side plate and the extension portion being co-planar.

10. The method of manufacturing of claim 9, wherein inner surfaces of the first face plate, the second face plate, the first side plate, and the second side plate define the internal socket, and including welding the second side plate to the first face plate to form a weld interface therebetween.

11. The method of manufacturing of claim 9, including positioning the distal edge surface to be flush with an inner surface of the extension portion, and forming a weld interface along the distal edge surface.

12. The method of manufacturing of claim 9, including:

forming a plurality of slots in the extension portion of the first face plate;

forming a plurality of tabs in the distal edge surface of the second side plate; and inserting the plurality of slots into the plurality of slots.

13. The method of manufacturing of claim 9, including forming the second side plate to extend from the third bend to the extension portion having the side plate distal edge that extends outwardly beyond the outer surface of the first side plate.

14. The method of manufacturing of claim 13, including forming a weld interface along the distal edge surface.

15. The method of manufacturing of claim 9, including:

forming a plurality of slots in the extension portion of one of the first face plate and the second side plate;

forming a plurality of tabs in the distal edge surface of the other of the first face plate and the second side plate; and inserting the plurality of tabs into the plurality of slots.

16. The method of manufacturing of claim 9, including abutting the distal edge surface against the inner surface of the extension portion.

* * * * *